Aug. 10, 1948.                A. NORMAN                    2,446,549
                              FLOAT VALVE
Filed April 6, 1945                                  2 Sheets-Sheet 1
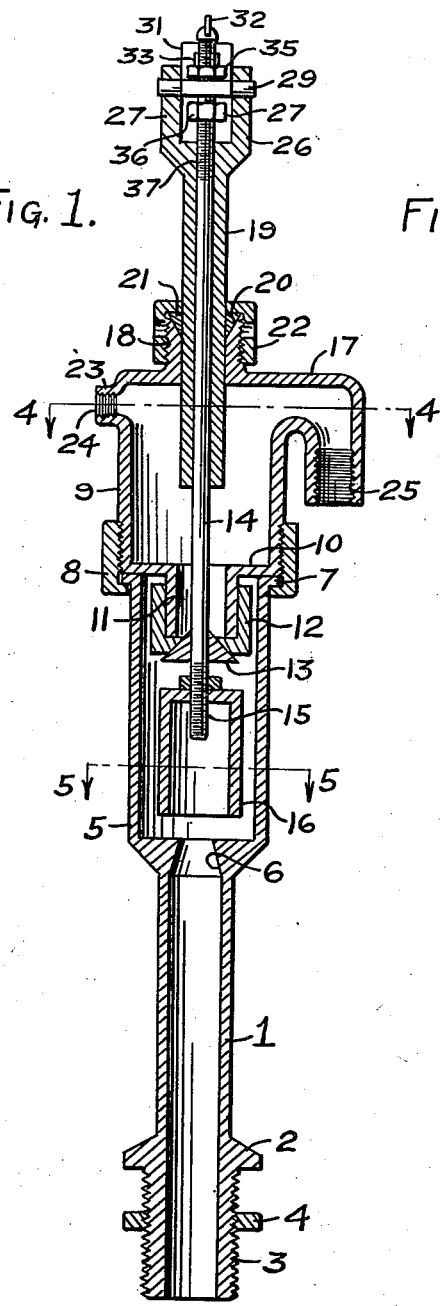
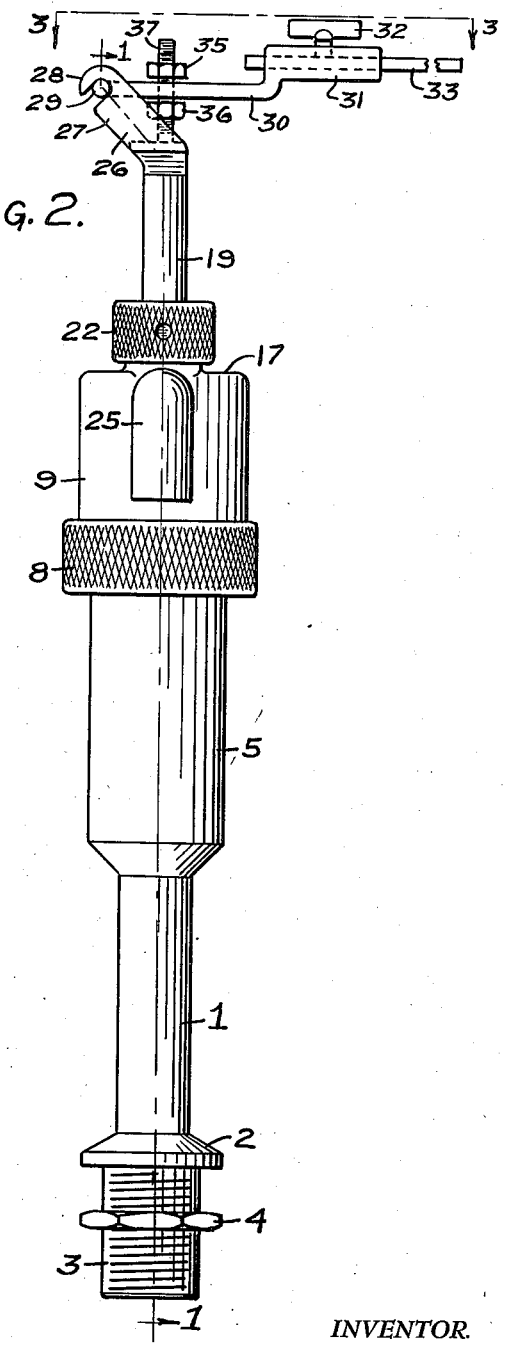
INVENTOR.
AUGUSTUS NORMAN
ATTORNEYS Aug. 10, 1948.  A. NORMAN  2,446,549
FLOAT VALVE Filed April 6, 1945  2 Sheets-Sheet 2

*INVENTOR.*
AUGUSTUS NORMAN

BY *Victor J. Evans & Co.*

ATTORNEYS

Patented Aug. 10, 1948

2,446,549

UNITED STATES PATENT OFFICE 2,446,549

FLOAT VALVE

Augustus Norman, Pittsburgh, Pa.

Application April 6, 1945, Serial No. 586,907

3 Claims. (Cl. 137—104)

My present invention, in its broad aspect, has reference to improvements in float valves, and more particularly, it is my purpose to provide a simple, sturdy and practical valve which is fully adjustable for varying conditions of use and differences in water pressure, and which is designed to open and close on a line of valve movement coaxial with the flow of water, which also utilizes the force of the water passing through the valve to close the same, which has means for preventing contact of scale, and other foreign substances with the valve and seat, which operates without use of springs or rubber washers, and which is non-siphoning and will operate without the use of a copper or metal float, the operation of the valve being such that a block of wood or anything buoyant enough to float is all that is necessary, and which has a positively actuated motor means for compelling the valve to close and which is operated by flow of water in the stream, and is adjustable to water pressure, and cooperates with a volume reducer to centralize water pressure, and which affords great energy in effecting closure of the valve. In addition, to the above, my flow responsive valve closure means, or motor, functions in the dual capacity of a screen or filter to prevent scale and the like from reaching the valve and seat.

Other and equally important objects and advantages of my invention will be apparent from the following description and drawings, and it is pointed out that changes in form, size, shape, materials, and construction and arrangement of parts is permissible and within the purview of my broad inventive concept, and the scope of the appended claims.

In the drawings, wherein I have illustrated a preferred form of my invention:

Figure 1 is a vertical section;

Figure 2 is a side elevation;

In the drawings, wherein like characters of reference are used to designate like or similar parts:

Figure 3:
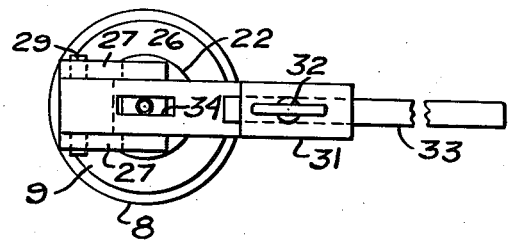
Figure 3 is a view looking in the direction of line 3—3 of Figure 2.
Figure 4:
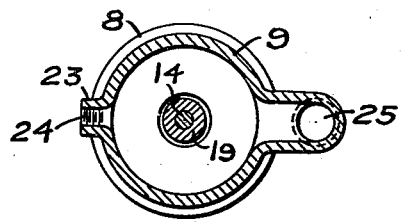
Figure 4 is a section on the line 4—4 of Figure 1.
Figure 5:
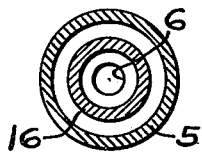
Figure 5 is a section on the line 5—5 of Figure 1.
Figure 6:
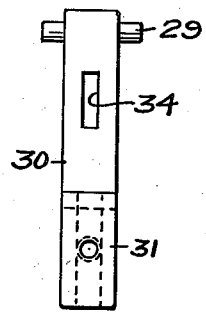
Figure 6 is a detail top plan view of the float valve lever.

The numeral 1 designates the water inlet pipe of the valve which is annularly flanged at 2 to seat and be supported on the bottom of the tank, and is threaded at 3 to receive the clamping nut 4. The pipe 1 has a cylindrical enlarged valve casing 5 at its upper end, and an upwardly beveled volume reducing flange 6 is provided in the passage to center and control the volume or stream of water entering the casing 5. The upper end of the casing 5 is annularly flanged at 7 to be engaged by the threaded union 8 removably connecting the cylindrical bonnet or housing 9 to the casing. At the base 10 of the bonnet or housing 9 is a depending sleeve 11 upon which is carried a cylindrically flanged valve seat 12 of softer metal than the conical valve 13 mounted on the stem 14 which extends upwardly through the bonnet or housing and downwardly into the casing as at 15. The end 15 is threaded to mount a hollow cylindrical water filter and water flow responsive device (or motor) 16 which is adjustable thereon so that for high water pressures the device 16 may be moved away from the inlet passage above the flow reducing flange 6, and for low pressures it may be adjusted toward the inlet passage and flange 6. Furthermore, scale and foreign matter entering with the inflow of water is intercepted and trapped by the flow responsive device which functions as a screen to prevent clogging of the valve and valve seat. At the top 17 of the housing 9 is a threaded bored boss 18 through which is received the elongated valve guide 19. The boss has a beveled seat 20 for a wedging washer 21 which is held in place and pressed against the guide by a nut 22 so that the guide is adjustable about its axis as well as vertically and rigidly held in place. The valve stem 14 passes upwardly through the guide and is slidable with respect thereto. A refill tube (not shown) is connected to the nipple 24 of Figure 1, and a water outlet 25 is provided to the tank. The upper end of the valve guide 19 is bifurcated or forked as at 26 to provide laterally inclined arms 27 having hooked ends 28 to engage a cross pin 29 carried by the lever 30 of the float rod connection, which has a tubular part 31 through which is adjustably connected by a wing nut 32 the float rod 33. The lever 30 has an elongated opening 34 through which the valve stem 14 passes. A pair of attaching and adjusting nuts 35 and 36 on the threaded end 37 of the stem are arranged above and below the lever 30 so that the valve stem is moved in response to movement of the float rod under the influence of the float (not shown) to seat or unseat the valve 13. However, since the device 16 or motor will automatically close the valve 13 under the influence of water flow, it is not necessary that copper or metal floats be employed, a float of any material which is buoyant enough to sustain itself—such as a block of wood—will suffice. Furthermore, the essential parts of my device are adjustable throughout, and the bonnet or housing, and the valve seat are easily demountable and removable.

From the foregoing, it is believed that the operation and advantages of my invention will be apparent, but it is again pointed out that interpretation of its scope should only be conclusive when made in the light of the subjoined claims.

I claim:

1. A valve, actuating mechanism, comprising a cylindrical valve casing having a water inlet, a beveled flow control flange about the inlet at its connection with the casing, a hollow flow responsive device in the casing, a housing removably attached to the casing and having a water outlet, a valve stem slidably mounted in the housing and extending into the casing, a flow responsive device being adjustably mounted on the stem, said stem being movable by the flow responsive device, adjustable stem supporting means on the housing, and an operating lever attached to the supporting means, and adjustably engaged with the stem for the movement thereof, said flow responsive device and the stem on which it is mounted, as well as the casing and the housing being axially aligned with the direction of flow of the water into and through the housing whereby scale and foreign matter is intercepted by the flow responsive device to prevent clogging of the housing.

2. A device of the character described, comprising a water inlet pipe, a valve casing on the water inlet pipe, a beveled flow control flange about the inlet at its connection with the casing, a hollow, inverted flow responsive device in the casing, a housing removably attached to the casing and having a water outlet, a valve stem slidably mounted in the housing and extending into the casing, a removable valve seat of soft metal carried by the housing, a conical valve on the stem coacting with said seat the flow responsive device adjustably mounted on the valve stem for moving said stem toward the flange and axially of the water current for high and low pressures, adjustable valve stem supporting means on the housing a bifurcated or forked upper end on said means providing spaced parallel arms, hooked ends on said arms, a lever having a cross-pin engaging the hooked ends of said arms, and adjustably connected with a float arm and with the valve stem for co-action between the flow responsive device and the flow control flange.

3. The invention as defined in claim 2 wherein the flow responsive device is hollow and clindrical and has an open bottom end.

AUGUSTUS NORMAN.

REFERENCES CITED

The following references are of record in the file of this patent:

UNITED STATES PATENTS

| Number | Name | Date |
| --- | --- | --- |
| 540,760 | Sawyer | June 16, 1895 |
| 1,177,963 | Peterson | Apr. 4, 1916 |
| 1,773,110 | Meyers | Aug. 19, 1930 |
| 1,893,859 | Gleason | Jan. 10, 1933 |

FOREIGN PATENTS

| Number | Country | Date |
| --- | --- | --- |
| 56,731 | Norway | June 22, 1936 |
| 118,112 | Australia | Feb. 8, 1944 |